United States Patent
Fiat

(10) Patent No.: US 8,320,303 B2
(45) Date of Patent: Nov. 27, 2012

(54) WIMAX NETWORK, WIMAX NETWORK ELEMENT, AND METHOD OF HANDLING QOS REQUIREMENTS THEREIN

(75) Inventor: Lionel Fiat, Garches (FR)

(73) Assignee: Alcatel Lucent, Paris (FR)

( * ) Notice: Subject to any disclaimer, the term of this patent is extended or adjusted under 35 U.S.C. 154(b) by 1378 days.

(21) Appl. No.: 11/749,440

(22) Filed: May 16, 2007

(65) Prior Publication Data

US 2007/0291686 A1     Dec. 20, 2007

(30) Foreign Application Priority Data

Jun. 20, 2006 (EP) .................................. 06291022

(51) Int. Cl.
*H04W 4/00* (2009.01)
(52) U.S. Cl. ..................................................... 370/328
(58) Field of Classification Search .................. 370/328, 370/270, 241, 252, 419, 278, 312, 469, 230, 370/331, 356, 401, 235; 709/229, 232, 238, 709/245, 224, 221, 222
See application file for complete search history.

(56) References Cited

U.S. PATENT DOCUMENTS

| | | | | |
|---|---|---|---|---|
| 7,299,062 B2 * | 11/2007 | Yi et al. | ........................ | 455/511 |
| 7,502,845 B2 * | 3/2009 | Sanghvi et al. | ............... | 709/223 |
| 7,986,664 B2 * | 7/2011 | Fischer | ......................... | 370/329 |
| 2005/0157660 A1 * | 7/2005 | Mandato et al. | .............. | 370/254 |
| 2006/0092879 A1 | 5/2006 | Jeong et al. | | |
| 2006/0285529 A1 * | 12/2006 | Hares et al. | ................... | 370/338 |
| 2009/0135783 A1 * | 5/2009 | Khalil et al. | .................. | 370/331 |

OTHER PUBLICATIONS

Nguyen H M, et al.: "Integration of micro-mobility with QoS in IP/MPLS-based radio access networks" VTC 2003—Spring, The $57^{TH}$ IEEE Semiannual Vehicular Technology Conference Proceedings, Jeju, Korea, Apr. 22-25, 2003, IEEE Vehicular Technology Conference, New York, NY: IEEE, US, vol. 4, Apr. 22, 2003, pp. 2261-2265, XP010862257.

Kassler A, et al.: "Multimedia communication in policy based heterogeneous wireless networks" Vehicular Technology Conference, 2004, VTC 2004—Spring, 2004 IEEE $59^{TH}$ Milan, Italy May 17-19, 2004, Piscataway, NJ, USA, IEEE, US, vol. 5, May 17, 2004, pp. 2987-2992, XP010766798.

* cited by examiner

*Primary Examiner* — Melody Mehrpour
(74) *Attorney, Agent, or Firm* — Fay Sharpe LLP

(57) ABSTRACT

A method of handling QoS requirements in a wireless communication network (1), wherein a QoS request message (A) associated with said QoS requirements is sent from a core network (2) to an access network (3.1, 3.2) responsible for resource allocation to an end terminal (4, 4') requiring a particular service to a wireless access gateway (9) The proposed method comprises the step of allocating a wireless access gateway (9) at initial authentication of the end terminal (4, 4') while the latter is still connected to the network.

9 Claims, 2 Drawing Sheets

WIMAX NETWORK, WIMAX NETWORK ELEMENT, AND METHOD OF HANDLING QOS REQUIREMENTS THEREIN

The invention is based on a priority application EP 06 291 022.9 which is hereby incorporated by reference.

TECHNICAL FIELD

The present invention relates to a method of handling QoS requirements in a wireless communication network, wherein a QoS request message associated with said QoS requirements is sent from a wireless core network to a wireless access network responsible for resource allocation to an end terminal requiring a particular service through a wireless access gateway, said method comprising the step of forwarding the QoS request message from a first receiving wireless access gateway to a second serving wireless access gateway upon a mobility event of the end terminal.

The present invention also relates to a core network for use in a wireless communication network, to a wireless communication network, and to a computer program product.

BACKGROUND OF THE INVENTION

Providing particular services over a wireless communication network (e.g. Wimax or 3GPP LTE (Long Term Evolution)/SAE (System Architecture Evolution), for instance providing IP Multimedia Subsystem (IMS) related services, requires that corresponding Quality-of-Service (QoS) requests be relayed from an element of a wireless core network (also referred to a Connectivity Service Network—CSN) generally referred to as Policy Decision Function (PDF) to an Access Network Gateway (ASN-GW, also referred to as Wireless Access Controller—WAC) and further to a particular base station of the wireless communication network under the coverage of which the end terminal is currently located.

Nowadays, end terminals are usually devised in the form of mobile stations or user equipment which are free to move and may therefore change location from base station to base station which may furthermore entail changing the WAC. Consequently, a solution is needed which allows notifying the PDF to which WAC QoS requests for a particular end terminal should be addressed.

Prior art solutions rely on specifying a dedicated new interface between WAC and PDF for forwarding dedicated messages which indicate a current terminal location (terminal location update) each time an end terminal changes from one WAC to another. These prior art solutions suffer from the inherent disadvantages of requiring the costly definition of a new interface which furthermore creates a mobility-dependent feature in the CSN/IMS core of the wireless communication network which reduces operational flexibility.

SUMMARY OF THE INVENTION

It is the object of the present invention to provide a method of handling QoS requirement of the above-defined type which does not rely on defining new interfaces and which will not reduce operational flexibility due to creation of mobility-dependent features in the CSN/IMS core of the wireless communication network. It is also an object of the present invention to provide a network element of the above-defined type as well as a wireless communication network which enable translation of the inventive methods into practise.

According to a first aspect of the present invention the object is achieved by providing a method of the above-defined type which further comprises the step of allocating the receiving wireless access gateway at initial authentication of the end terminal.

According to a second aspect of the present invention the object is achieved by providing a core network for use in a wireless communication network, comprising means for receiving an authentication message in connection with an end terminal from an access network of the wireless communication network, said authentication message comprising an identifier of a QoS managing entity in said access network; means for storing said identifier; and means for sending a QoS request message in connection with said end terminal to the entity specified by said identifier.

According to a third aspect of the present invention, the object is also achieved by providing a wireless communication network, in particular a Wimax network, comprising a plurality of access networks, and a core network according to said second aspect of the present invention.

Furthermore, according to a fourth aspect of the present invention, the object is achieved by providing a computer program product, comprising program code sequences operable to implement in a core network of a wireless communication network:
  means for receiving an initial authentication message in connection with an end terminal from an access network of the wireless communication network, said initial authentication message comprising an identifier of a QoS managing entity in said access network;
  means for storing said identifier;
  means for sending a QoS request message in connection with said end terminal to the entity specified by said identifier.

In a further embodiment the computer program product in accordance with the present invention comprises program code sequences operable to implement in an access network of the wireless communication network:
  means for receiving QoS request messages from the core network, said QoS request messages comprising QoS requirements for a service required by the end terminal;
  means for forwarding said QoS request messages to a corresponding network element of a further access network, if the end terminal is attached to said further access network.

In this way and in accordance with a general idea underlying the present invention, a QoS management entity of the WAC, said entity generally being referred to as Service Flow Activation (SFA) entity, is allocated for a given end terminal from a CSN/IMS core point of view at initial authentication (i.e., first terminal network connection) of the end terminal in question. That particular WAC is then responsible for forwarding any IMS-QoS requests issued in connection with that end terminal to a WAC which is currently controlling/serving the terminal in question. Therefore, in a further embodiment of the method in accordance with the present invention, the latter comprises allocating the receiving wireless access gateway at initial authentication of the end terminal. Corresponding information concerning the allocated wireless access gateway (e.g., its address in the network) may be stored at the core network for subsequent use.

In another embodiment of the present invention, said service is an IMS-related service. In this context, said QoS requests may be identified with IMS-QoS requests comprising measurable QoS parameters, such as required bandwidth, bit rate, or the like.

In accordance with the present invention, the WAC to which the PDF sends the IMS-QoS request is fixed during initiation of terminal authentication, i.e. while the end terminal in question is still connected to the network, and thus corresponds to the WAC a given end terminal has initially been attached to. Owing to standard Authentication, Authorization, and Accounting (AAA) features, mobility of said end terminal to another WAC is transparent to an entity of the core network generally referred to as AAA server. In accordance with the present invention QoS requests will still be sent to the initially allocated WAC ("old WAC") which in turn is responsible for forwarding the received IMS-QoS request messages to the currently serving WAC ("new WAC"). In the context of forwarding said messages, commercially available mechanisms for inter-WAC communication may be employed (e.g., the SuperWAC solution commercialized by the present applicant).

Therefore, in a further embodiment of the network in accordance with the present invention the latter further comprises receiving an initial authentication message from an entity of the serving wireless access gateway at the core network, said initial authentication message comprising an identifier of the receiving wireless access gateway; storing said identifier in the core network; providing an entity of the core network with said identifier for sending the QoS request message to the receiving wireless access gateway specified by said identifier.

In this context, in a further embodiment of the core network in accordance with the present invention said authentication message is an initial authentication message of said end terminal.

One particular advantage of the present invention resides in the fact that reuse/unification of current interfaces for fixed solutions between Wimax access network and Wimax CSN/IMS core networks is possible for mobile IMS/QoS management.

Further advantages and characteristics of the present invention will become apparent from the following description of exemplary embodiments described with reference to the enclosed drawings. Features of the present invention described above as well as below can be used either individually or in conjunction. The following description of embodiments is not meant to be an exhaustive enumeration but rather as an exemplary description in connection with the basic ideas underlying the present invention.

In particular is should be noted that despite of the Wimax-specific terminology used, the present invention is not limited to Wimax networks and may equally be employed in connection with other wireless communication networks, e.g. the above-mentioned 3GPP LTE/SAE networks.

DETAILED DESCRIPTION OF PREFERRED EMBODIMENTS

The present invention shall now be described in connection with a wireless communication network in the form of a Wimax network. However, as will be appreciated by a person skilled in the art, the invention is not limited to use with that particular type of network.

Figure 1:
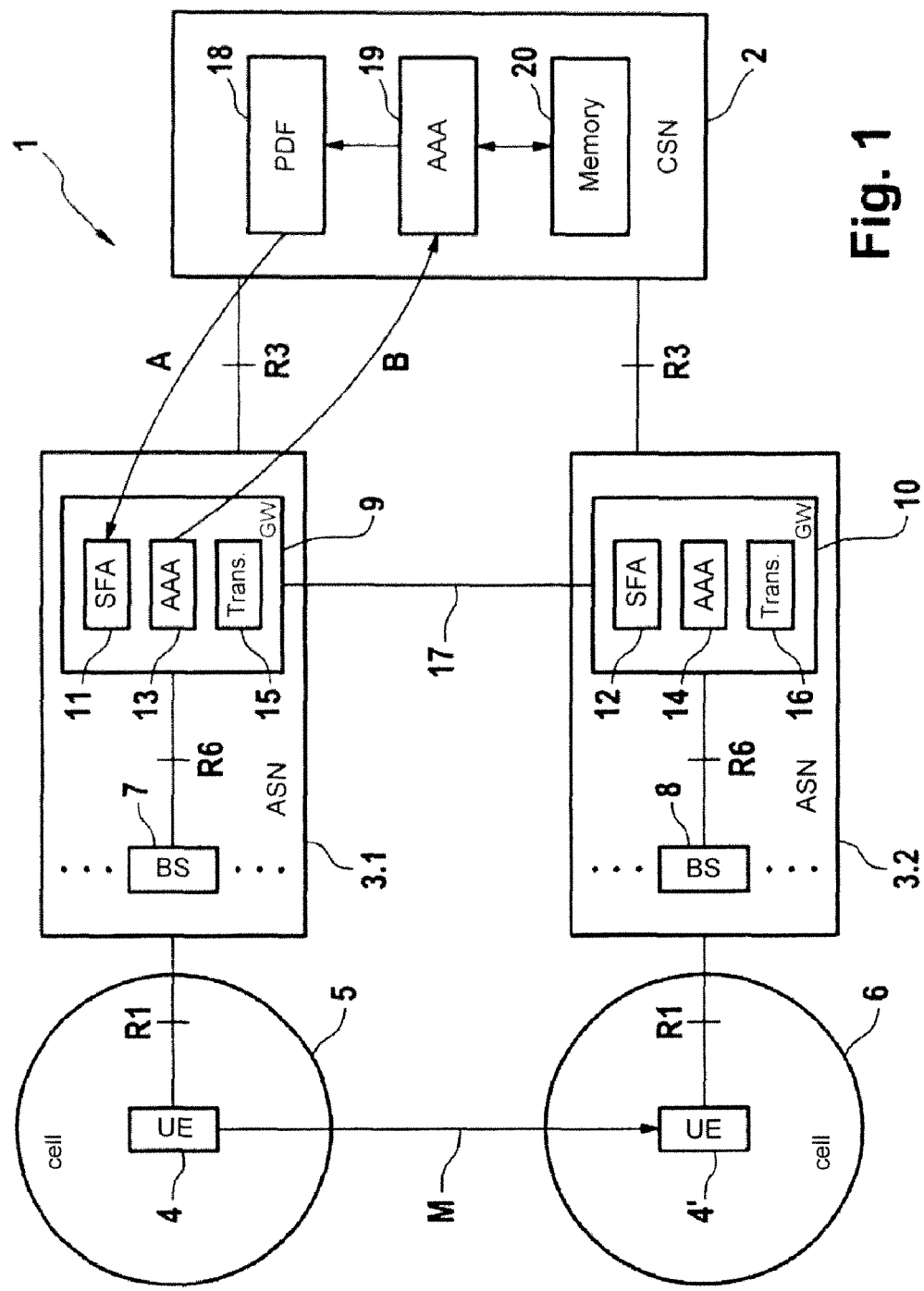
FIG. 1 is a schematic block diagram of a Wimax network in accordance with the present invention.

FIG. 1 shows a schematic block diagram of a Wimax network 1 in accordance with the present invention. The Wimax network of FIG. 1 generally corresponds to the Wimax Network Reference Model (NRM), as known to a person skilled in the art. That is, the Wimax network 1 comprises a core network 2 (also referred to as Core Service Network—CSN) and a number of access networks 3.1, 3.2, only two of which are depicted for reason of clarity and which are also referred to as Access Service Networks—ASN. The access networks 3.1, 3.2 are connected with the core network 2 by means of connections labelled R3, which refers to a corresponding NMR reference point.

An end terminal 4 (also referred to as user equipment or mobile station) is attached to the Wimax network 1 through an R1 connection with a suited access network, e.g. ASN 3.1, depending on its present location with respect to particular (geographical) zones of coverage 5, 6 (e.g., radio cells), two of which are depicted in FIG. 1.

As known to a person skilled in the art, each of said coverage zones 5, 6 is served by an associated base station 7, 8 provided within a respective access network 3.1, 3.2. In FIG. 1, only one such base station 7, 8 is depicted per access network 3.1, 3.2 merely for reason of clarity. Each base station 7, 8 is connected through an R6 connection with an Access Service Network Gateway (ASN-GW) 9, 10, which is also referred to as Wireless Access Controller (WAC), each of said WACs being common for all of the base stations in one particular access network.

Within each WAC 9, 10, Wimax network 1 further comprises a first entity 11, 12 also referred to as Service Flow Activation (SFA) module, a second entity 13, 14 also referred to as Authentication, Authorization, Accounting (AAA) proxy and a third entity 15, 16 in the form of a transceiving module.

Via connection 17 the WACs 9, 10 of different ASNs 3.1, 3.2 in the Wimax network 1 are inter-connected for a purpose which will be explained in more detail farther down.

Within CSN 2 the Wimax network 1 further comprises Policy Decision Function (PDF; also referred to as CSN-PDF) 18), AAA server 19, and memory 20.

The functioning of Wimax network 1 in accordance with the present invention will now be explained in detail with reference to the above-described FIG. 1:

In the embodiment shown, it is assumed that CSN 2 is devised as an IP Multimedia subsystem (IMS) core. IMS over Wimax requires that IMS Quality-of-Service (QoS) requests be relayed from PDF 18 in the CSN/IMS core 2 to an Access Network Gateway, e.g. WAC 9, and further to a particular Wimax base station, e.g. base station 7, under the coverage of which a target terminal, e.g. end terminal 4, is located. Generally, the end terminals will be mobile terminals which may move as indicated by arrow M in FIG. 1. In this way, they may change base stations as well as the corresponding WAC. This is indicated in FIG. 1, wherein end terminal 4 moves to a new location denoted 4', which is located in coverage zone 6 serviced by WAC 10 via base station 8.

The present invention addresses the technical problem of informing PDF 18 to which WAC said QoS request should be addressed. To this end, the QoS managing entity, i.e. the corresponding SFA entity, is associated with a given end terminal, e.g. end terminal 4, from a CSN/IMS core point of view during an initial authentication process of said end terminal. That is, when end terminal 4 first registers with an access network, e.g. access network 3.1, of which CSN 2 is informed through corresponding messages exchanged between AAA proxy 13 and AAA server 19, an identifier (address) of that particular SFA 11 (which generally corresponds to an address of AAA proxy 13) is stored in memory 20 of CSN 2. Said identifier is also provided to PDF 18 which correspondingly addresses its QoS request directly to the particular SFA/WAC serving end terminal 4 in its present location. This is indicated by means of arrow A in FIG. 1. The above-described AAA exchange between AAA proxy 13 and AAA server 19 is indicated by means of arrow B in FIG. 1.

For the following, it is assumed that end terminal 4 experiences a mobility event, i.e. moves out of coverage zone 5 served by base station 7 into the coverage zone of another base station, which can either be associated with the same WAC 9, i.e. the same SFA 11, or with another WAC/SFA, e.g. WAC 10/SFA 12, as is the case with coverage zone 6 in FIG. 1. In the context of the present invention, however, SFA 11 of WAC 9 always remains the WAC/SFA responsible for managing end terminal 4 in terms of QoS requirements.

In this way, regardless of the originating AAA proxy address provided in connection with a given end terminal, e.g. end terminal 4, 4', PDF 18 will always send QoS requests in connection with said end terminal to WAC 9/SFA 11 which were allocated for said end terminal during initial authentication. The WAC in question, i.e. WAC 9 in FIG. 1, is then responsible to forward the received IMS QoS requests to that particular WAC, e.g. WAC 10 in the embodiment of FIG. 1, currently controlling/serving the target terminal, e.g. end terminal 4'.

Thus, in the context of the present invention, if an end terminal moves and accordingly is managed by a new WAC, the WAC-SFA managing the end terminal will always be the SFA of the WAC the end terminal initially was attached to. However, the new WAC will notify the old WAC through transceiving means 15, 16 and connection 17 to redirect QoS requests to itself whenever a network-initiated QoS request is received concerning the end terminal in question. In other words: If an already authenticated end terminal, e.g. end terminal 4', enters a coverage zone, e.g. coverage zone 6, served by a different WAC than the WAC the end terminal was initially attached to, then the new WAC, e.g. WAC 10, will inform other WACs present in the Wimax network 1 that any QoS requests addressed to their respective SFA should be redirected to the new WAC, i.e. its corresponding SFA. To this end, every WAC 9, 10 present inside the Wimax network 1 in accordance with the present invention is equipped with said transceiving means 15, 16 and inter-connected with the other WACs by means of a connection similar to connection 17 of. FIG. 1.

It should be noted that the exact way in which the WACs notify each other which WAC-SFA was initially allocated for a given end terminal at authentication is beyond the scope of the present invention. In general, it may correspond to an already specified solution (SuperWAC) commercialized by the present applicant, which embeds the PDF. However, in contrast to the above-mentioned solution, in which one specialized WAC manages the entirety of CSN-QoS requests, in accordance with the present invention this particular function is supported by every single WAC present inside Wimax network 1 through transceiving means 15, 16 and connection 17. As explained in detail above, this role is always fulfilled by the particular WAC which is allocated for a given end terminal at initial terminal authentication.

Figure 2:
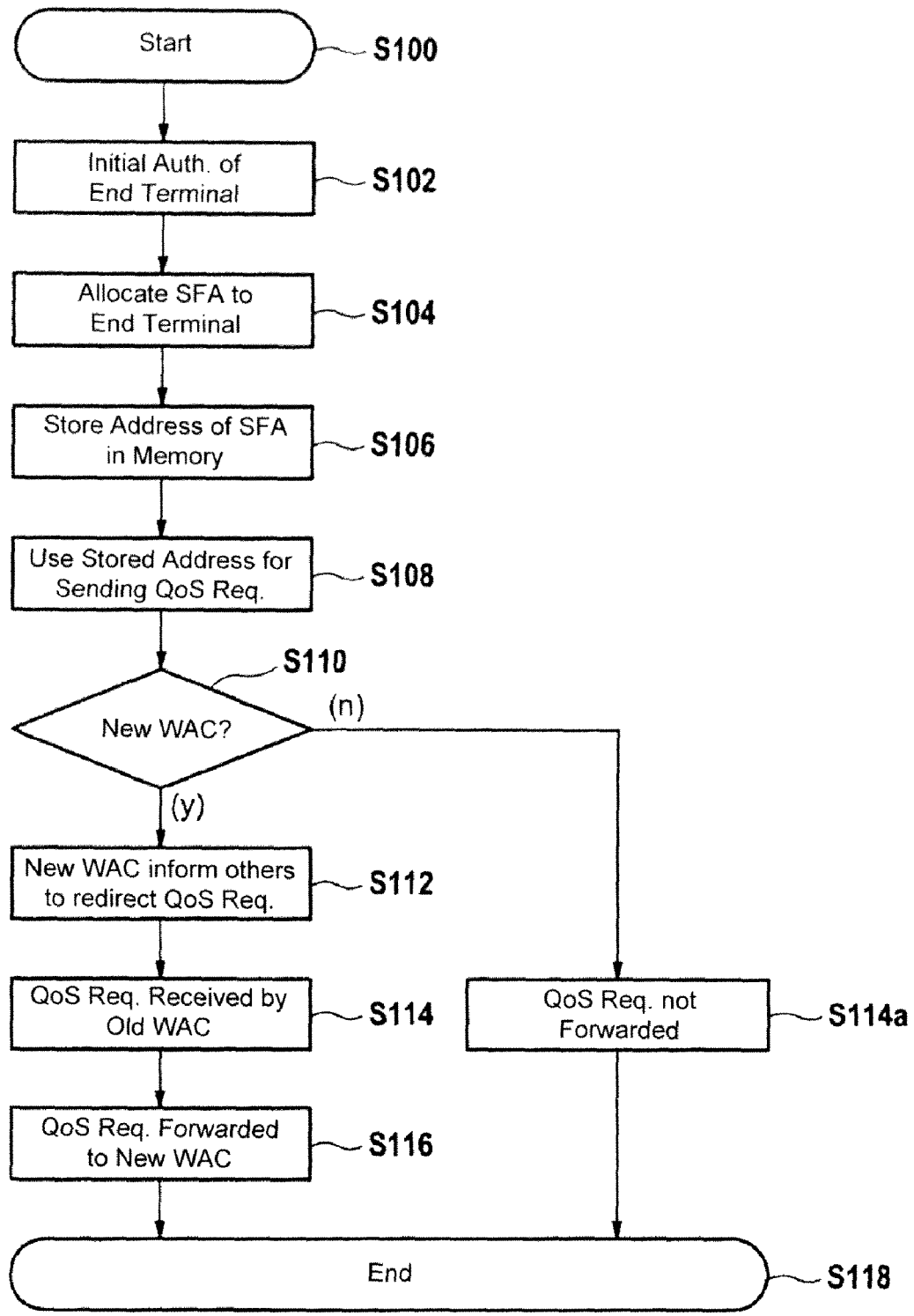
FIG. 2 is a flow chart of an embodiment of the method in accordance with the present invention.

FIG. 2 is a flow chart of an embodiment of the method in accordance with the present invention. The method starts with step S100. In subsequent step S102 initial authentication of an end terminal is performed, as explained in detail above and is known to a person skilled in the art.

Then, in step S104 the SFA of the WAC involved in the initial authentication process in step S102 is allocated (fixedly associated) with the end terminal in question. In step S106 a corresponding identifier (address) of that particular WAC-SFA is stored in a memory of the CSN (FIG. 1).

In a subsequent step S108, said (stored) address can be used for sending network-initiated QoS requests directly to the SFA of the WAC serving the end terminal.

Subsequent step S110 involves checking whether or not the end terminal in question is currently accessing the network through a different WAC (new WAC) than the WAC (old WAC) it was initially attached to. If the question in step S110 is answered in the affirmative (y), then in step S112 the new WAC informs any other WAC present in the Wimax network 1 that any QoS requests addressed to their respective SFA should be redirected to the new WAC, i.e. its corresponding SFA.

In subsequent step S114, a QoS request is received by the old WAC and is forwarded to the new WAC in step S116.

On the other hand, if the question in step S110 is answered in the negative (n), then the end terminal in question is still accessing the network through the WAC it was initially attached to. In this way, a QoS request received by the (old) WAC in step S114a need not be forwarded to any other (new) WAC.

In both cases (y/n in step S110) the method terminates with step S118.

In this way, the present invention makes use only of existing interface definitions between ASN-GW/WAC and CSN-PDF for handling QoS requirements in connection with mobile end terminals. Furthermore, the proposed solution is convergent with fixed Wimax at CSN level and therefore allows to reuse existing Rq-like (TISPAN) interfaces.

The invention claimed is:

1. A method of handling QoS requirements in a wireless communication network comprising:
    sending a QoS request message associated with said QoS requirements from a core network to a first receiving wireless access gateway of an access network, wherein the access network is responsible for resource allocation to an end terminal, wherein the first receiving wireless access gateway has been allocated at initial authentication of the end terminal as being responsible for managing the end terminal in terms of the QoS requirements;
    forwarding the QoS request message from the first receiving wireless access gateway to a second serving wireless access gateway upon a mobility event of the end terminal, wherein the first receiving wireless access gateway remains responsible for managing QoS requirements of the end terminal.

2. The method of claim 1, wherein said service is an IP Multimedia Subsystem (IMS) related service.

3. The method of claim 1, wherein said wireless communication network is a Wimax network or a 3GPP LTE/SAE network.

4. The method of claim 1, further comprising:
    receiving an initial authentication message from an entity of the serving wireless access gateway at the core network, said initial authentication message comprising an identifier of the receiving wireless access gateway;
    storing said identifier in the core network;
    providing an entity of the core network with said identifier for sending the QoS request message to the receiving wireless access gateway specified by said identifier.

5. A core network for use in a wireless communication network, comprising:
    a server that receives an authentication message in connection with an end terminal from an access network of the wireless communication network, said authentication message comprising an identifier of a QoS managing entity in said access network; and a memory that stores said identifier;

wherein said server continues to send, even after mobility event of the end terminal, a QoS request message in connection with said end terminal to the entity specified by said identifier, such that said entity remains responsible for managing QoS requirements of the end terminal.

6. The core network of claim 5, wherein said authentication message is an initial authentication message of said end terminal.

7. The core network of claim 5 implemented in a wireless communication network or a Wimax network, comprising a plurality of access networks.

8. A computer program product, comprising program code sequences on a non-transitory computer-readable media operable to implement, in a core network of a wireless communication network, the steps of:

receiving an initial authentication message in connection with an end terminal from an access network of the wireless communication network, said initial authentication message comprising an identifier of a QoS managing entity in said access network;

storing said identifier; and sending, even after a mobility event of the end terminal, a QoS request message in connection with said end terminal to the entity specified by said identifier, such that said entity remains responsible for managing QoS requirements of the end terminal.

9. The computer program product of claim 8, further operable to implement the steps of:

receiving QoS request messages from the core network, said QoS request messages comprising QoS requirements for a service required by the end terminal; and forwarding said QoS request messages to a corresponding network element of a further access network, if the end terminal is attached to said further access network.

* * * * *